(12) United States Patent
Suzuki

(10) Patent No.: US 7,165,222 B1
(45) Date of Patent: Jan. 16, 2007

(54) INFORMATION PROVIDING METHOD AND INFORMATION DISTRIBUTION APPARATUS

(75) Inventor: Toshimitsu Suzuki, Akashi (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 09/657,460

(22) Filed: Sep. 7, 2000

(30) Foreign Application Priority Data

Oct. 29, 1999 (JP) ................................. 11-307983

(51) Int. Cl.
G09G 5/00 (2006.01)

(52) U.S. Cl. ........................................ 715/744; 715/760

(58) Field of Classification Search ................ 345/733, 345/738, 744, 760; 709/246; 715/733, 738, 715/740, 744, 745, 747, 760
See application file for complete search history.

(56) References Cited

U.S. PATENT DOCUMENTS

| | | | | |
|---|---|---|---|---|
| 5,852,717 A * | 12/1998 | Bhide et al. | ................. | 709/203 |
| 6,023,714 A * | 2/2000 | Hill et al. | .................... | 715/513 |
| 6,029,182 A * | 2/2000 | Nehab et al. | ................ | 715/523 |
| 6,035,339 A * | 3/2000 | Agraharam et al. | ......... | 709/246 |
| 6,300,947 B1 * | 10/2001 | Kanevsky | .................... | 345/866 |
| 6,332,131 B1 * | 12/2001 | Grandcolas et al. | ........... | 705/35 |

FOREIGN PATENT DOCUMENTS

| | | |
|---|---|---|
| EP | 0 719 016 A2 | 6/1996 |
| EP | 0 872 990 A1 | 10/1998 |
| JP | 11-161684 | 6/1999 |
| JP | 11-194983 | 7/1999 |
| JP | 11-242644 | 9/1999 |
| WO | WO 98/15091 | 4/1998 |
| WO | WO 98/47270 | 10/1998 |

OTHER PUBLICATIONS

Communication dated Sep. 19, 2005 for European Patent Application No. 00123335.2-2413.

* cited by examiner

Primary Examiner—Kristine Kincaid
Assistant Examiner—Thanh Vu
(74) Attorney, Agent, or Firm—Staas & Halsey LLP

(57) ABSTRACT

A world wide information network called the Internet is structured and the information distribution service via the network is now operating in which it is now possible to obtain and make reference to every type of information resources through connection to the Internet. However, the type of distributed information and environment of user terminal connected to such information distribution service are all diversified and therefore it is sometime impossible to process the information requested from the user in the user terminal even if such requested information is transmitted to the user terminal. The present invention distributes information, in the information distribution service for transmitting the information to the terminal based on the request from a user through the network, by confirming the function of the terminal of user who has requested the information, determining whether the requested information can be processed with the function of the terminal and then converting, when processing is determined as impossible, the information to the format which may be processed.

34 Claims, 16 Drawing Sheets

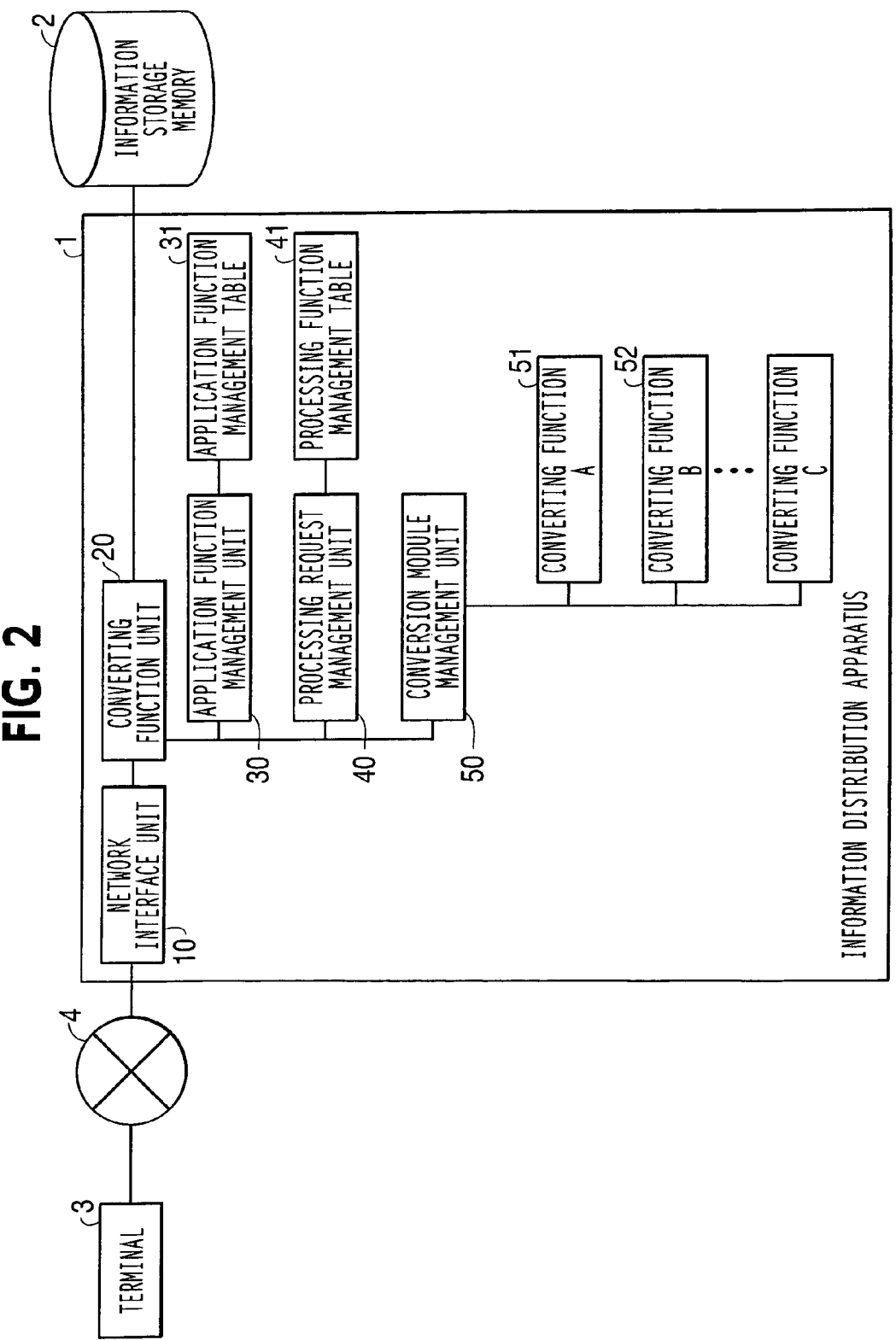

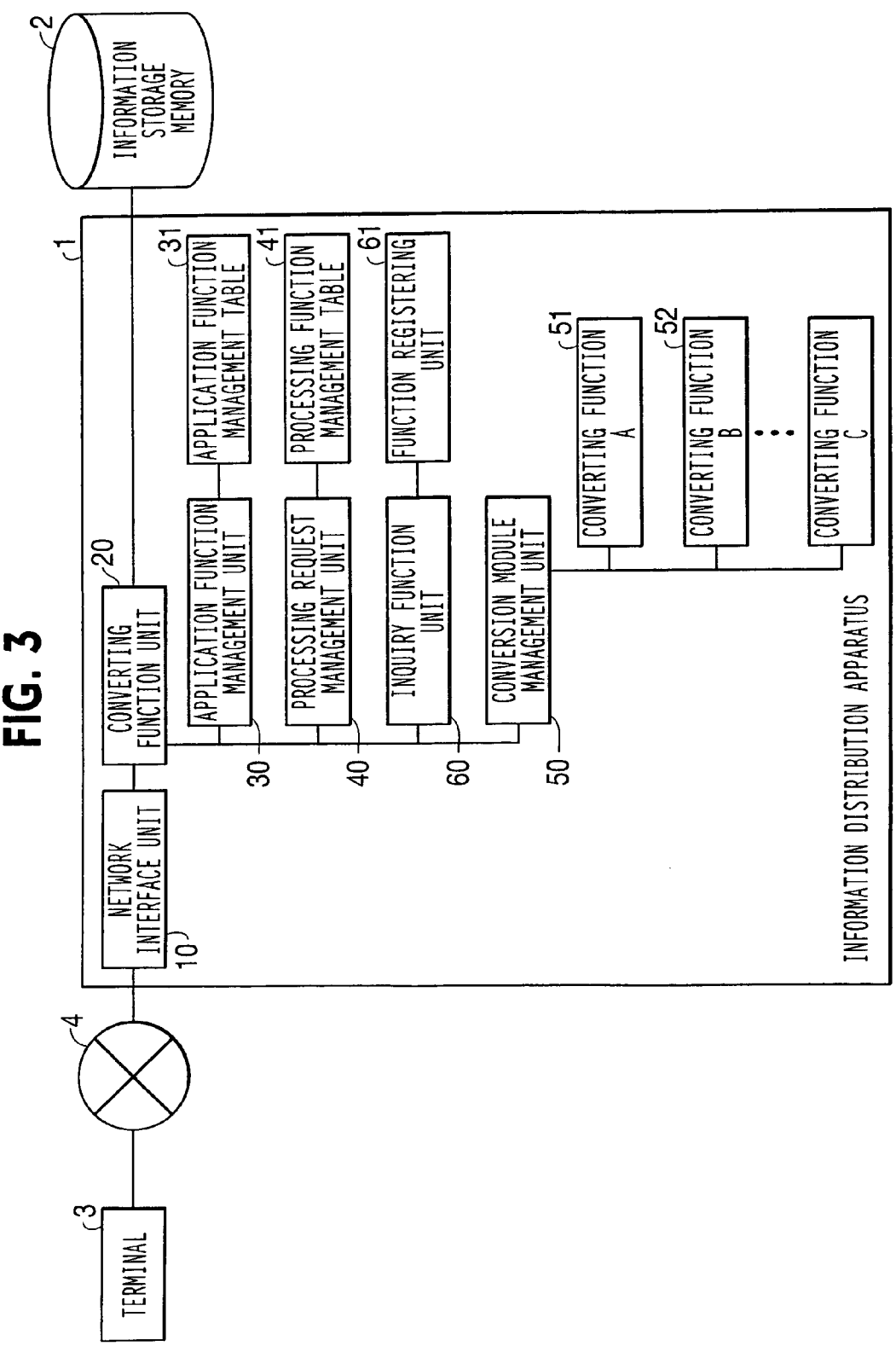

FIG. 4A APPLICATION FUNCTION MANAGEMENT TABLE 31

| APPLICATION NAME | TEXT DISPLAY | HTML DISPLAY | HTML LINK | XML DISPLAY | XLINK | XPOINTER | OTHER ITEMS |
|---|---|---|---|---|---|---|---|
| BROWSER A | ○ | ○ | ○ | × | × | × | ... |
| WORD PROCESSOR B | ○ | ○ | ○ | ○ | × | × | ... |
| BROWSER C | ○ | × | × | ○ | ○ | ○ | ... |
| ... | ... | ... | ... | ... | ... | ... | ... |
| 31-1 | 31-2 | 31-3 | 31-4 | 31-5 | 31-6 | 31-7 | 31-8 |

FIG. 4B PROCESSING FUNCTION MANAGEMENT TABLE 41

| PROCESSING NAME | HTML CONVERSION | LINK CONVERSION | POINTER CONVERSION | BURYING | OTHER ITEM |
|---|---|---|---|---|---|
| BROWSER A | ○ | ○ | × | × | ... |
| WORD PROCESSOR B | ○ | ○ | ○ | × | ... |
| BROWSER C | × | × | ○ | ○ | ... |
| ... | ... | ... | ... | ... | ... |
| 41-1 | 41-2 | 41-3 | 41-4 | 41-5 | 41-6 |

FIG. 4C

USER MANAGEMENT TABLE (NO. 1) — 90

| USER IDENTIFIER | BROWSER NAME | REGISTERED APPLICATION NAME |
|---|---|---|
| USER A | BROWSER A | APPLICATION A, D |
| USER B | BROWSER A | APPLICATION B, E |
| USER C | BROWSER B | APPLICATION C, F |
| . . . | . . . | . . . |

USER MANAGEMENT TABLE (NO. 2) — 90

| USER IDENTIFIER | KIND OF TERMINAL | LINK CONVERSION |
|---|---|---|
| USER A | DESKTOP | OFF |
| USER A | NOTEBOOK | ON |
| USER B | HANDHELD TELEPHONE | ON |
| . . . | . . . | . . . |

90-1, 90-4, 90-5

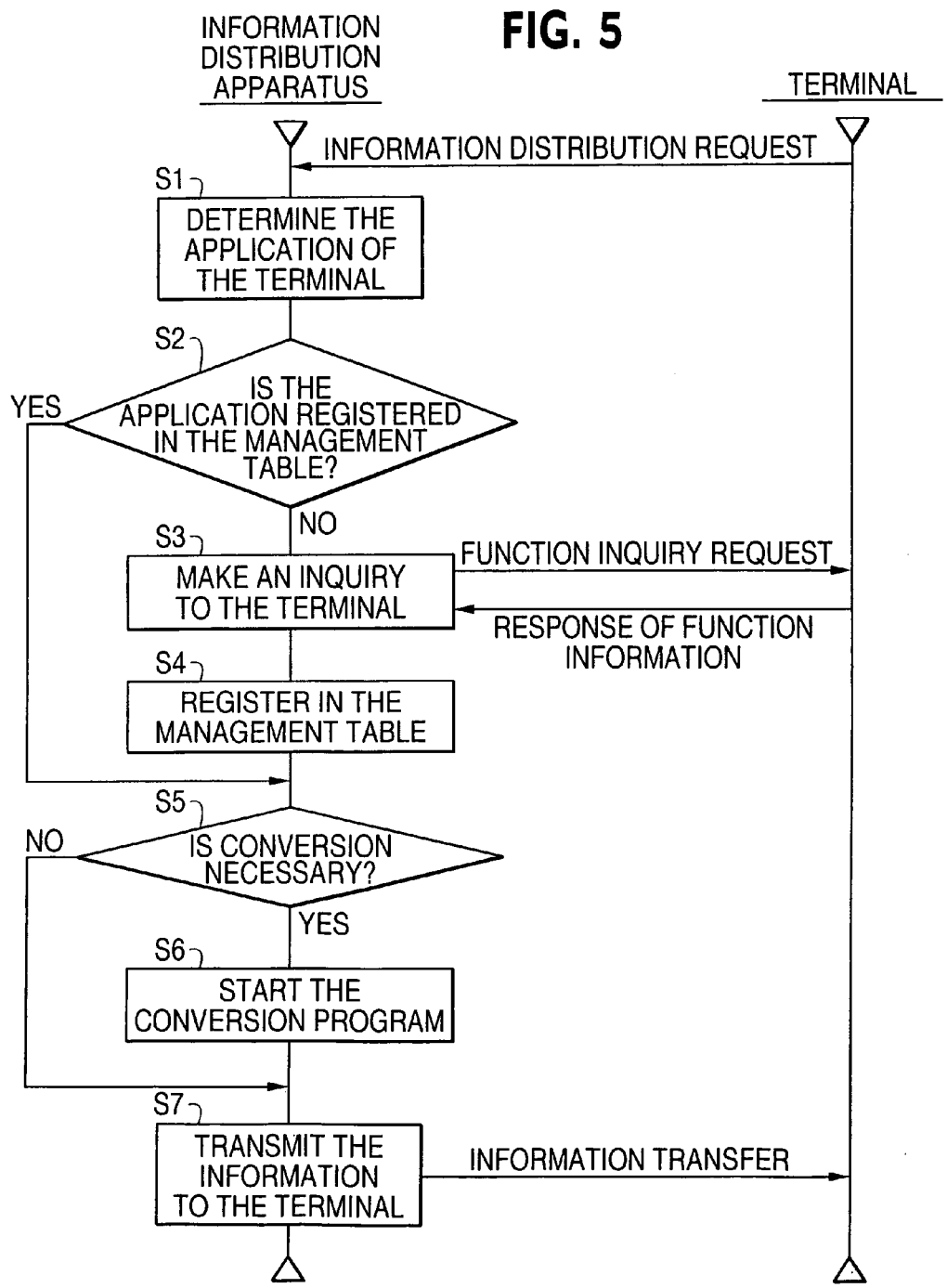

FIG. 9

```
<doc>
<title>TITLE</title>
<link xml:link="simple" href="kiji-1.xml  #child(1,text)   "acutate="user" show="replace"/>
</link>
<p>: SENTENCE STARTS . . . . . . . </p>
</doc>
```
⇩ CONVERSION

```
<doc>
<title>TITLE</title>
<link xml:link="simple" href="  kiji-1.xml   "acutate=""user" show="replace"/>
</link>
<p>: SENTENCE STARTS . . . . . . . </p>
</doc>
```

FIG. 10

```
kiji-2.xml
<doc>
  <title>:TITLE</title>
  <link>
    <xlink xml:link="extended" inline="true">
      <locator xml:link="locator" href="el/kiji-1.xml"/>
      <locator xml:link="locator" href="el/kiji-2.xml"/>
    </xlink>
  </link>
  <p>: SENTENCE STARTS ...... </p>
</doc>
```
10-1
10-1-1

⇩ CONVERSION

```
kiji-2.xml
<doc>
  <title>:TITLE</title>
  <link href="el/kiji-1.xml"><p>:SENTENCE STARTS ...... </p></link>
</doc>
```
10-2
10-2-2

FIG. 11

11-1
```
<link>
  <locator href="e1/kiji-1.xml#child(1,title)/>
  <locator href="e1/kiji-2.xml#child(1,title)/>
</link>
```

11-2
```
<link>
  <locator href="e2/kiji-n.xml#child(1,title)/>
  <locator href="e1/kiji-1.xml#child(1,title)/>
</link>
```

11-3
kiji-1.xml
```
<kiji-1>
<title>:TITLE</title>
<p>:
 .......</p>
</kiji-1> SENTENCE STARTS.
```

⇩ CONVERSION 11-4
kiji-1.xml
```
<kiji-1>
<title>:TITLE<a href="e1/kiji-2.xml">REFERENCE 1</a><a href="e2/kiji-n.xml">REFERENCE 2</a></title>
<p>:
 .......</p>
</kiji-1> SENTENCE STARTS.
```

FIG. 15A

```
<doc> FUNCTION CHECK DISPLAY
<title> FUNCTION CHECK DISPLAY </title>

<link>
<xlink xml:link="extended" inline="true">
<locator xml:link="locator" href="CHECK RESPONSE cgi"/>
<locator xml:link="locator" href="CHECK DATA xml#child(1,p1)"/>
</xlink>
</link>
<p> CLICK THE LINK WHEN THE LINK IS DISPLAYED BELOW </p>
<p1>/XLink POSSIBLE/</p1>
</doc>
```

FIG. 15B

CLICK THE LINK
WHEN THE LINK IS
DIPLAYED BELOW

XLink POSSIBLE

FIG. 15C

CLICK THE LINK
WHEN THE LINK IS
DIPLAYED BELOW

XLink POSSIBLE

INFORMATION PROVIDING METHOD AND INFORMATION DISTRIBUTION APPARATUS

BACKGROUND OF THE INVENTION

1. Field of the Invention

The present invention relates to an information distribution service for accepting an information distribution request from a terminal connected through a network and transmitting the requested information to the terminal and a distribution method for distributing the requested information to a terminal in the information distribution apparatus and information distribution system.

2. Description of the Related Art

Recently, a gigantic information network called the Internet has been constructed and utilized through mutual connections of computers and computer networks in the world. On this gigantic information network, various services are put into practical use and users can utilize various services distributed around the world while staying at home.

As an example, there is provided an information distribution service called the World Wide Web (WWW). In the World Wide Web, information which may be disclosed in general or only to limited persons is stored on a server computer connected to the gigantic information network. A user at a remote computer or other device capable of communicating via the Internet (hereafter referred to as a "terminal") is capable of making access to nearly any information on any server connected to the Internet by connecting the terminal to such server via the Internet. In other words, users can access the information scattered throughout the world while staying at home or anywhere.

To make it possible for a user to transmit or receive the information available via the Internet without relation to the type of computer used, not only must a common protocol (for example, TCP/IP) be used for data transmission and reception, but also the content of information to be received and transmitted must be in a common format and language. One description language that is commonly used is Hyper Text Markup Language (HTML). A user is capable of browsing information in HTML by making use of general purpose browser software such as well known Netscape Navigator® and Microsoft® Internet Explorer.

At the beginning, HTML has developed by mainly describing the content of information. At present, a link function is fulfilled with which it is now possible to make reference to remote information from a "web page" of information written in HTML by providing an address of the remote information. Since a large amount of information is scattered on the Internet, evaluation for the worth of the information itself and the worth of the location of information is desired and a structured language fulfilling the link function such as extensible markup language (XML) is now being developed. XML improves on HTML by providing an independent link function.

Therefore, the information providing server is now capable of presenting not only its own information but also information from another server by making reference thereto. Namely, information may exist at any device which may be accessed through the network and as the method for presenting information, it is also possible to register the information and present only the location of information depending on the presentation purpose. In other words, the information presenting side (web server) and the terminal to which the information is presented are now capable of respectively presenting and browsing information easily in a wider range.

However, fulfillment of function of a structured language such as XML requires improvement in the browser software for browsing information described with the structured language. Moreover, information existing on the network is versatile not only in its amount but also in the registration modes and the related information is not always described with the structured language. As an example, link destinations may be generated with word-processor software and stored in a mode depending on the word-processor software. In this case, when such word-processor software is installed at the terminal operated by a user, such word-processor software is automatically used to display the link destination information, but if such software is not installed, a user may be unable to reference the link destination information.

Terminals which may be connected to the Internet or other network include various devices ranging from a personal computer which assures as required the full functions to a hand-held telephone set which is inevitably restricted in its functions. Hand-held telephone sets which previously have been provided only with the functions of conversation through audio communication and reception/transmission of text, such as e-mail and pages are now being given an interface, like the i-mode function, that enables Internet communication and a browser function, although this function is more limited than the function of a personal computer. In the case of a hand-held telephone set, there are such restrictions on the browser function and the display area is small, but it is possible for a hand-held telephone set to enjoy the information distribution service through connection with the WWW explained above using limited browser function.

In addition, currently available are a television receiver called a Web TV and digital televisions which include a connection to the Internet. Such television receivers assure easy reception of the information via the Internet by using a remote control unit or wireless keyboard.

As explained above, the environment for utilizing the Internet is diversified and the types of information resources available via the Internet service are also diversified. There is a great deal of variation in the type of terminals connected to the Internet and the functions they perform. As a result, the service environment varies depending on the types and functions of the terminals connected thereto. In addition, even when the type and function of terminals are identical, the software installation and version conditions may be different. Namely, there are numerously different conditions depending on users and environment patterns. On the other hand, although there is great variety in the information available via the Internet, all of the information is defined and known on the information distributing side of the Internet.

When a user tries to browse the information on the Internet, the user expects, regardless of what type of terminal is used, that the information to be displayed is always displayed correctly. However, actually, if the environment of the terminal used is deviated from the environment required to correctly display the obtained information, the information cannot be displayed adequately or may be displayed in a meaningless condition. A practical example of such display condition will be explained below. As the first example, it is assumed that information described using XML is obtained using a browser which only supports a link of one direction of HTML. If a two-way link not supported by HTML is included in the obtained information, the browser cannot recognize such link and does not display that the link is extended or description of the structured language indicating the link is displayed as if it were a part of the content of information. In this case, even when a user has obtained the information, he cannot correctly recognize the content of information and cannot effectively use such information.

As the second example, it is assumed that the information requested by the browser is not described with a structured language such as HTML but has been generated with a word processor. In this case, it is no longer possible to make reference to the information if the word processor software used to generate the information is not installed at the user terminal from which the information is requested. In this case, it cannot be said that information is smoothly distributed to users.

To avoid these problems, it usually is assumed that the user terminal is always set in the latest condition. However, since the environment changes quickly in the field of the Internet and computers, based on quick technical innovation, and the type of terminal and applications installed also change more and more quickly in wider range, it is not easy to cope with such quick changes. Moreover, if it is impossible to process the distributed information, it is now discussed to provide the function of converting the information so that the terminal can process it. However, in this case, maintenance of the converting function is required in response to newly distributed or improved functions and it is difficult to always provide the latest function because of quick changes in the converting functions.

Moreover, even on the information distributing side of the Internet, maintenance of information already registered will require, depending on the amount of information and extent of expansion in function, much working load. Therefore, changes in information formats are usually not performed unless there is a change of information content. In addition, information is generated in a plurality of formats depending on the intrinsic format of the applications used to generate the information, while information is transmitted by selecting the transmission mode depending on the environment of the terminal. However, it is not preferable that the same information exists in a plurality of different formats because adequate maintenance is not always performed to all formats of information when maintenance of the information is required. Moreover, it is presumed that there is a difference in when the maintenance of each format occurs, even when maintenance is conducted to all formats of information. Furthermore, the memory capacity for storing the information increases as the number of information formats to be stored increases.

SUMMARY OF THE INVENTION

It is an object of the present invention to distribute, in the information distribution service on the Internet, every kind of information registered on the Internet in such a condition that reference is possible with the user terminal even when the environment of user terminal from which the information request is issued is set to any condition.

It is a further object of the invention that when the environment of user terminal from which the information is requested is recognized and when the requested information includes a type and format which cannot be used in the user terminal, the information as a whole or only the relevant part of information is transmitted after it is converted to a type and format that can be used by the user terminal.

The present invention is based on the finding that the application used can become a problem when the information is stored on the information distributing side of the Internet and the user requests distribution of the information to browse the obtained information.

When a terminal connected to the network desires reception of information from a distribution service, a service request is issued using application software, such as a browser application. In this case, information regarding the application software used to make the request is often transmitted as a part of the service request. Moreover, when the application software used can be identified, the capabilities of the application software can naturally be confirmed. Namely, when the environment of the requesting terminal becomes apparent, it is possible to determine whether the requested information can be processed by the terminal. When it is determined that the process is impossible, the requested information is processed to be compatible with the confirmed functions of the requesting terminal and thereafter the converted information is transmitted. Thereby, the terminal is capable of making reference to any information registered in an information distribution service without regard to the environment of the requesting terminal.

Namely, the present invention proposes an information distributing method used by an information distribution service for accepting a request for information distribution from terminals connected via a network and transmitting the requested information to the terminals, wherein the capabilities of the application used by the terminals to transmit information distribution requests is confirmed when the information distribution requests are received from the terminals. It is determined whether the requested information may be processed given the capabilities of the application used and when it is determined that processing is impossible, the information to be distributed is converted to a format that may be processed by the application before the information is transmitted to the terminal.

BRIEF DESCRIPTION OF THE DRAWINGS

FIG. 2 is a block diagram illustrating a basic structure of the information distribution apparatus of the present invention.

FIG. 3 is a block diagram illustrating a structure of the information distribution apparatus in a first embodiment of the present invention.

FIG. 4A is an example of the application function management table.

FIG. 4B is an example of the processing function table.

FIGS. 4C–4D are examples of the user management table.

FIG. 5 is a flowchart of processing by the information distribution apparatus of the present invention.

FIGS. 8–11 are explanatory diagrams illustrating conversion examples of the distributed information.

FIG. 15 is an explanatory diagram illustrating a practical example of the inquiry function.

DETAILED DESCRIPTION OF THE INVENTION

Figure 1:
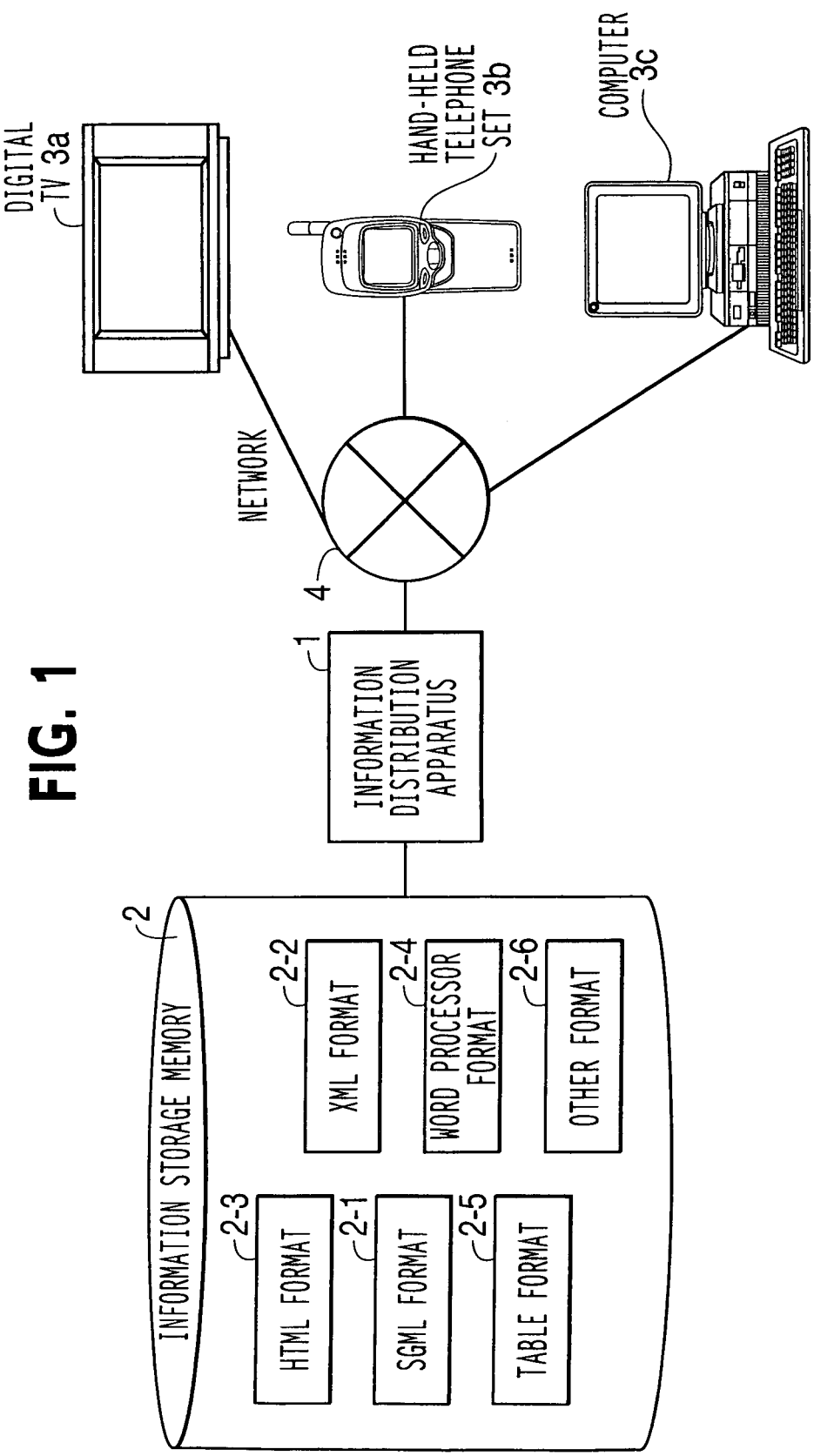
FIG. 1 is a block diagram illustrating an information distribution system of the present invention.

An example of information distribution service to which the present invention is adapted will be explained below with reference to FIG. 1 which illustrates an example of the system configuration of an information distribution service utilizing the present invention. An information distribution apparatus 1 is connected to a plurality of terminals 3 via a network 4. Only one information distribution apparatus 1 is illustrated but it is possible to provide a plurality of information distribution apparatuses. In the same manner, a plurality of devices may be used as terminal 3, including, but not limited to digital TV 3a, hand-held telephone 3b, and computer 3c illustrated in FIG. 1. In addition, the information distribution apparatus 1 is provided with an information memory device 2, as a back-end device, storing the information distributed depending on the request. The information to be distributed may be stored not only in the back-end device indicated in this example but also in secondary memory device(s) (memory, disk, CD-ROM, MO, or the like) in the information distribution apparatus 1 depending on the amount of information. In the information memory device 2, information may be in a structured language, such as SGML 2-1, XML 2-2, or HTML 2-3, or in a form corresponding to the application software used to generate the information, such as word-processor format 2-4, spreadsheet format 2-5 or some other format 2-6.

The information distribution apparatus 1 receives an information distribution request transmitted from the terminal 3, extracts the information requested from the information memory device 2 and transmits such information to the terminal 3. The terminal 3 refers to the information obtained using the browser and the application software depending on the format of distributed information.

FIG. 2 illustrates the basic structure of the information distribution apparatus 1 of the present invention. The information distribution apparatus 1 is composed of an interface network unit 10, a converting function unit 20, an application function management unit 30, a processing request management unit 40 and a conversion module management unit 50. The network interface unit 10 has the function of decomposing data received from the network 4 and composing data transmitted over the network 4 depending on the communication protocol in the data transmitted and received through the network 4. The function of the network interface 10 is a general function of network processing and is not an essential function of the present invention and therefore, detailed explanation of this function will not be provided. The converting function unit 20 converts SGML to HTML, as realized in the related art, and also executes the converting function of the present invention in combination with the application function management unit 30, processing request management unit 40 and conversion module management unit 50.

The application function management unit 30 searches the application function management table 31 based on the application used in the terminal 3 which issued the request for distribution of information to confirm the function of the application executing on the terminal 3. Necessity of information conversion is determined by collating the function of the application and the type and format of the requested information. When it is determined that the user terminal 3 which issued the request for information distribution is of the type and format which disables a reference included in the requested information, the application function management table indicates that it is necessary to convert the requested information to a type and format that may be processed in the user terminal 3. Thus, the application function management table 31 is used to detect the functions of the applications which may be processed in the terminals 3.

When it is determined that conversion is necessary, the processing request management unit 40 searches the processing function management table 41 to identify the conversion system for the information requested by the terminal 3 and further to confirm whether optional functions are used. The processing function management table 41 registers usage of functions which are different depending on the version of the application or user setting for applications registered in the application function management table.

Moreover, the present invention also may make an inquiry to the terminal 3 when the application software operating in the terminal 3 is not registered in the application function management table 31 and when the application information cannot be obtained from the information distribution request from the terminal 3. FIG. 3 illustrates the basic structure of an information distribution apparatus 1 having an inquiry function unit 60 which confirms the identity of the application operating in the terminal 30 and also confirms the functions of this application. Therefore, it is possible to recognize the functions of unknown applications not registered in the application function management unit 30 and processing request management unit 40 and thereby, the necessity for conversion of distributed information can be determined and the conversion can also be conducted. Moreover, the conversion function can be improved by registering the information obtained from the inquiry function unit 60 in the application function management table 31 and processing function management table 41 via the function registering unit 61.

FIGS. 4A–4B illustrate examples of the contents of application function management table 31 and processing function management table 41. The application function management table 31 registers the functions which may be used by each application operating in the terminal 3. In the example illustrated in FIG. 4A, when the application is browser A, it has the functions of HTML display and HTML link but does not have the functions of XML display, Xlink, or Xpointer. However, when the application is browser C, it has the functions of XML display, Xlink and Xpointer but does not have the functions of HTML display and HTML link.

The processing function management table 41 performs management for the conversions required depending on the application(s) available at terminal 3 when the information distribution request is received from the terminal 3. In the example illustrated in FIG. 4B, when the application is browser A which does not support XML, conversion to HTML is necessary (HTML conversion 41-1) when the information format is XML. Similarly, conversion to HTML link is necessary (link conversion 41-3) when both-way link is used in the information requested by the terminal 3 and the pointer conversion (41-4) and burying (41-5) are not performed, disabling the display.

Moreover, it is also possible to realize more detailed conversion of information to be distributed to each user by providing a user management table 90 as illustrated in FIG. 4C. The user management table 90 in FIG. 4C is formed of a user identifier 90-1, a browser name 90-2 and a registered application name 90-3. The user identifier 90-1 may be any information which can identify a user who is trying to receive the information distribution service, such as log-in name, user ID for making access to the information distribution apparatus and the network address of terminal 3. As the browser name 90-2, the name of the browser which is usually used by the user is registered corresponding to user ID. As the registered application name 90-3, an application other than the browser used in the terminal 3 is registered. When a user has connected to the information distribution service, the user management table 90 is searched on the basis of the user ID and thereby, the environment of terminal 3 of a registered user, such as browser name used by user and another application which may be used, can be obtained easily. When the user management table 90 is used, it is also possible to determine the necessity of conversion through the combination of the application function management table 31 and processing function table 41 and user management table 90. For example, if it is impossible to determine whether the pointer conversion is necessary by identifying the name of browser from the user management table 90, the processing function table 41 is searched using the browser name as the keyword. When pointer conversion is unnecessary, the requested information is distributed without any conversion and when pointer conversion is necessary, the pointer function included in the requested information is converted before distribution of requested information.

As another example of the user management table 90, it is also possible to record for the user 90-1 the corresponding kind of terminal 90-4 as illustrated in FIG. 4D. This is particularly effective when a user has a plurality of terminals 3. In the example illustrated in FIG. 4D, it is assumed that user A uses a desk-top personal computer which can provide full performance and also uses a notebook personal computer, such as at his house or during business trips. In this case, even when the same browser software is used, it is also possible to employ different information conversion depending on use of the desk-top personal computer having a large display area and use of the notebook personal computer having a small display area. Moreover, when software, which is installed in the desk-top personal computer is not installed in the notebook personal computer used, it is also possible to change the conversion system depending on the computer used by the user.

Upon reception of the information acquisition request from terminal 3 via the network interface 10, the converting function unit 20 identifies, from the content included in the acquisition request, which application in terminal 3 issued the information acquisition request. As an example, when a general purpose browser, such as Netscape Navigator®, is used, the name of browser used and version information are transmitted as part of the information acquisition request. Therefore, such information can be extracted from the contents of the information request.

After the application used in the terminal 3 is identified, the application function management unit 30 searches the application function management table 31 using the identified application name to confirm the functions supported by the requesting application. The processing request management unit 40 confirms the format of the requested information to determine when reference to the information is possible with the functions supported by the application used in the terminal 3. When reference is impossible, the necessary conversion process is selected by the conversion module management unit 50 and the conversion module required for conversion is executed. When conversion is completed, the converted information is transmitted via the network interface unit 10 to the terminal 3 which requested the information.

FIG. 5 is a flowchart indicating the process flow of an information distribution system according to the first embodiment of the present invention. As illustrated in FIG. 5, in step S1 the information distribution apparatus 1 obtains from the content of a request from the terminal 3, the identity of the application used by the terminal 3 to request the information. Where a user transmits the information distribution request to the information distribution apparatus 1 using a browser in the terminal 3, the name of browser used in the terminal 3 (and most likely, the version information) is included in the information distribution request. For example, when a user has accessed a home page using Netscape Navigator®, use of Netscape Navigator® as the browser is included, together with the home page address designated by a user, in the condition request data transmitted via the network to the information distribution apparatus 1 storing the relevant home page information.

In step S2, the application function management unit 30 and processing request management unit 40 confirm whether an application name used in the terminal 3 is registered in the application function management table 31 and processing function management table 41. This is required in a case where the information to be distributed has been generated with word-processor software under the assumption that the browser has the function to transmit, as the information to recognize the application used in the terminal 3, the application name and version information of the browser and in addition the name of a helper application and plug-in used in cooperation with the browser. Thereby, whether such information may be browsed can be determined depending on registration of the helper application and plug-in software, because the type and format of information which may be displayed in the terminal 3 can be determined easily. When the application name is registered in one of the tables 31 and 41, the process moves to step S5 as described later. If the application name is not registered in any table, the process goes to the step S3.

In step S3, the inquiry function unit 60 generates an inquiry to confirm the function of the application used in the terminal 3 which issued the information request. Upon reception of the answer from the terminal 3, in step S4 the application name and function of application detected through the inquiry are stored in the application function management table 31 or in the processing function management table 41.

In step S5, the functions of the requesting application registered in the application function table 31 or the processing function management table 41 are collated with the type and format of the information to be distributed to determine whether conversion of information is necessary. When it is detected that conversion is necessary, processing continues with step S6. When it is determined that conversion is not necessary, the requested information is transmitted in direct to the terminal 3 (step S7 of FIG. 5).

In step S6, the functions of the requesting application registered in the application function management table 31 and processing function management table 41 are collated with the format of the information to be distributed to determine what conversion is necessary and an instruction to execute the conversion program for necessary conversion is issued to the conversion module management unit 50. The conversion module management unit 50 selects from among the conversion functions 51, 52, . . . and executes the selected function. In step S7, the conversion module management unit 50 generates the information to be distributed which has completed the necessary conversion and transmits the converted information to the terminal 3 via the network interface unit 10.

Figure 6:
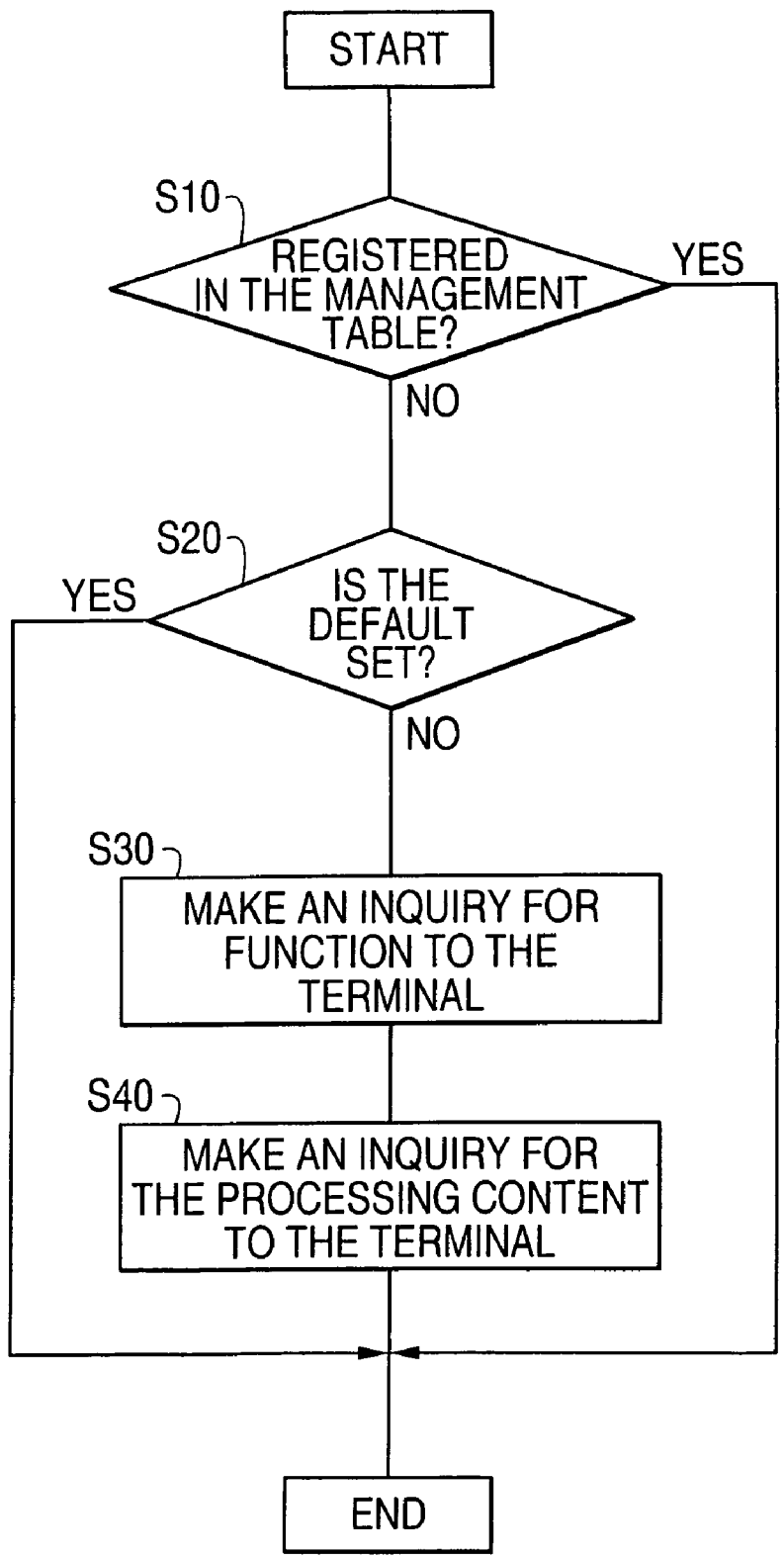
FIG. 6 is a flowchart of processing by the inquiry function unit of the present invention.

FIG. 6 is a flowchart illustrating the processing of the inquiry function unit 60. When the application used in the terminal 3 is registered in the application function management table 31 or processing function management table 41 (YES in step S10), the conversion process is executed based on the content registered in the tables 31, 41 and the inquiry function unit 60 does not perform any process. When the application is not registered in the application function management table 31 or processing function management table 41 (NO in step S10), it is first confirmed in step S20 whether the predetermined process is specified. When a default process is specified (YES in step S20), the default conversion process is executed to complete the process. If the default process is not specified (NO in step S20), inquiry is made to the terminal 3 for the application used therein (step S30). Moreover, when it is necessary to confirm the detail functions of the application, the inquiry is made to the terminal 3 for the detail functions (step S40).

Inquiry to the terminal 3 may be made using conventional methods, such as urging the user to input the information about the environment of the terminal 3 using the FORM input of HTML, or an applet or the like may be transmitted to the terminal to obtain the application mapping definition information. Alternatively, when the information to be distributed uses all of the latest functions of XML, sample data requiring users to perform a certain action may be transmitted to the terminal 3 using the XML function(s) required by the requested information. When the terminal 3 is capable of processing such function(s), the sample data is displayed correctly on the terminal 3 and the user performs the action in response to the displayed content. When a response is returned from the terminal 3, it is determined that such function(s) can be utilized. If no response is received, it is assumed that the terminal 3 is incapable of handling the required functions.

FIG. 15A is an example of XML code that can be transmitted to the terminal 3 for the purpose of inquiry to generate the display in FIG. 15B or FIG. 15C at the terminal 3. The sample data in FIG. 15A checks whether the extended link of XML may be used. In the code shown in FIG. 15A, the extended link is described, followed by a message to urge the user to check the function of the terminal 3 and a message to urge the user to execute the responding manipulation by "clicking" on the link. Thereafter, the message to display the link is described. When the sample data in FIG. 15A is transmitted to the terminal 3, the display in FIG. 15B is generated indicating that the link is extended, if the terminal 3 supports XML. When the user clicks the extended link, the response is notified to the inquiry function unit 60 and thereby it can be confirmed that the extended link is displayed normally because a program for detecting clock operation (response for confirmation; cgi) is provided in the linking destination. If the extended link is not supported, the linking is not recognized and the display in FIG. 15C is generated which is same as that for an ordinary message, as indicated by no underlining of "X L i n k". Since the link information is invalidated, no response from the user is ever notified to the inquiry function unit 60 even if the user clicks the message. If no response is received from the user after monitoring for a predetermined period of time, it is determined that the relevant function cannot be used. Using this technique, it is possible to prepare sample data for checking many different functions.

Figure 7:
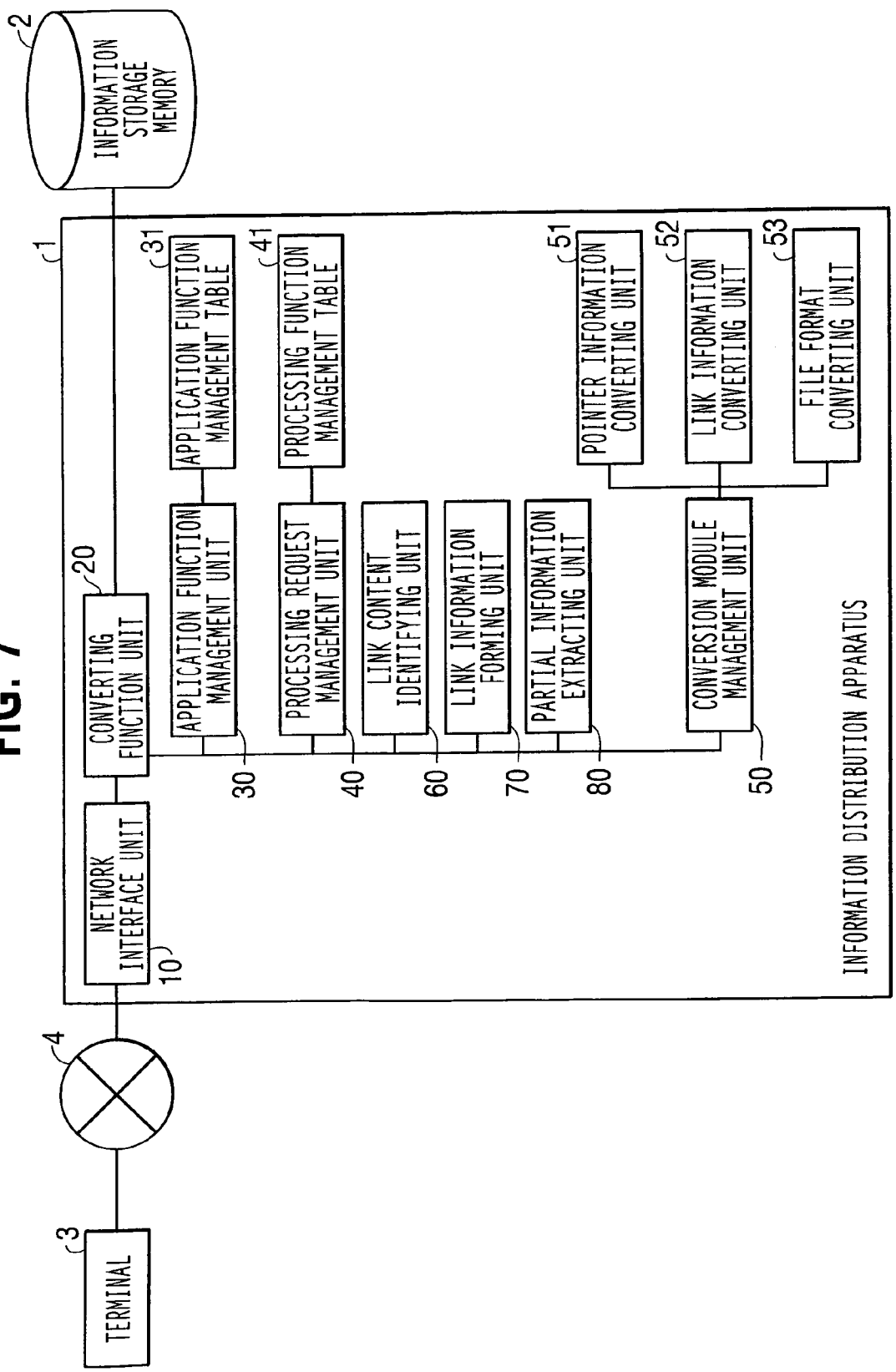
FIG. 7 is a block diagram illustrating a structure of the information distribution apparatus of the second embodiment of the present invention.

FIG. 7 is a block diagram of the second embodiment of the present invention. In this embodiment, a practical example of the information converting functions are provided. In this embodiment, a pointer information converting unit 51, a link information converting unit 52 and a file format converting unit 53 are provided to perform the converting functions and these units are under the management of the conversion module management unit 50. The conversion module management unit 50 calls the necessary conversion module from the converting function units 51, 52, 53 and then executes the information conversion depending on an instruction from a link content identifying unit 60, a link information structuring unit 70 and a partial information extracting unit 80.

Figure 8:
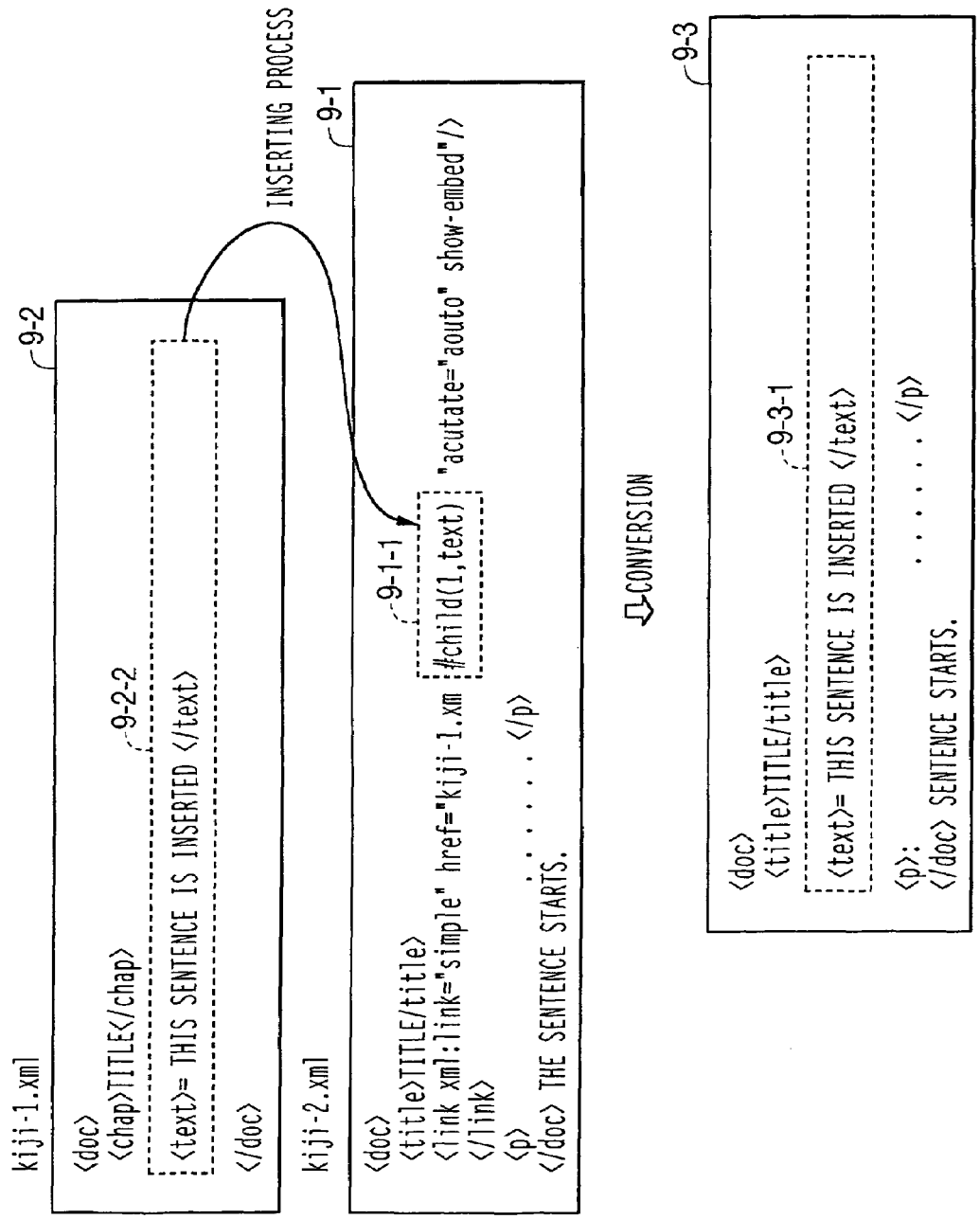
Figure 12A:
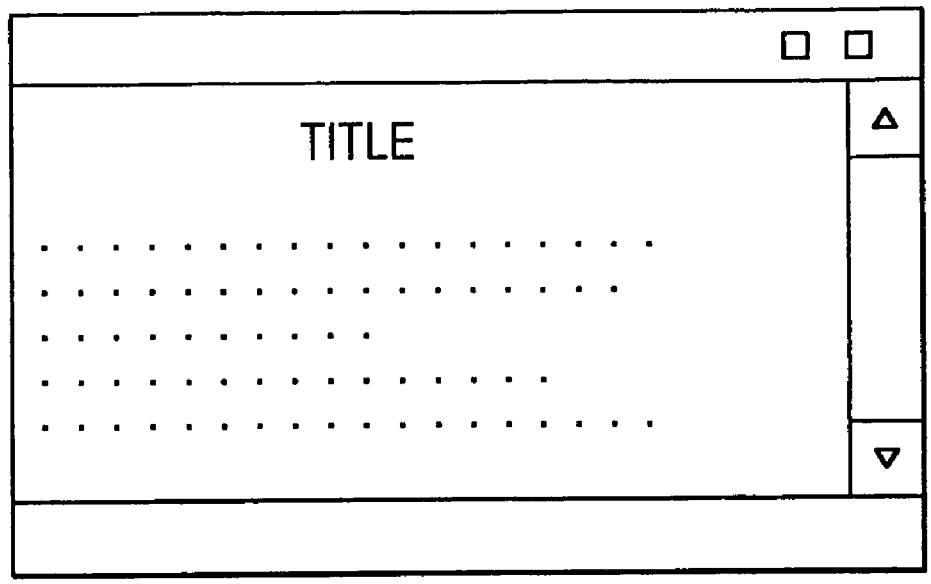
FIGS. 12A and 12B are display diagrams illustrating what is displayed at the terminal for the fourth conversion example.
Figure 12B:
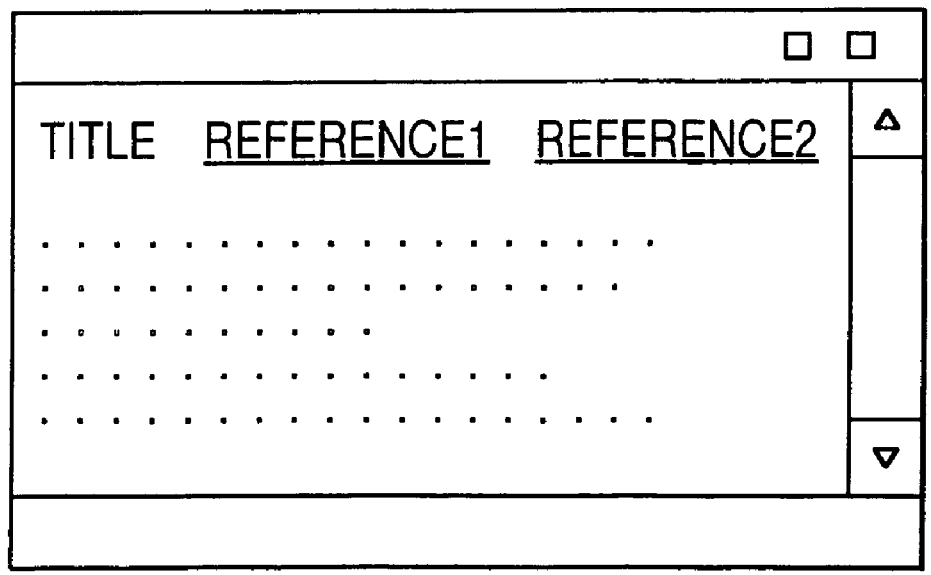

Examples of conversion by the pointer information converting unit 51 are illustrated in FIGS. 8 and 9. In FIGS. 8 and 9, the requested information 9-1 includes a link 9-1-1 for partial reference. In the case of both FIG. 8 and FIG. 9, it is assumed that the requesting application used in the terminal 3, has Xpointer registered as disabling(X), i.e., the function of pointer conversion is disabled. In FIG. 8, the conversion is conducted in the manner that the information 9-2-2 as the object of partial reference is obtained and it is then incorporated into the information to be transmitted. Thereby, when an information request is generated from a terminal having no pointer function, the information which is being referred through use of the pointer function is transmitted by burying it directly into the linked area. Therefore, the user can browse the requested information correctly.

FIG. 9 illustrates an example of the conversion of the link 9-1-1 of the partial reference to a link 9-4-1 to a file. Using this type of conversion, when the request is issued from a terminal 3 having no pointer function, the link function is not invalidated and it can be displayed that there exists a link destination. In this case, reference has naturally been possible only to a part of the information of the link destination, but it is now possible to browse the information of the link destination as a whole. However, the condition in which it is no longer recognized that the link is extended in the relevant area, if there is not any problem from the point of view of security, the user can recognize the existence of a link destination and there is a possibility for adequate distribution of the requested information.

Examples of conversion by the link information converting unit 52 are illustrated in FIGS. 10–13. In the example of conversion of FIG. 10, an extended link 10-1-1 is included in the requested information and a one-way link 10-2-2 is buried into the respective information for which the link is extended when the terminal 3 which generated the information request does not have the function of extended link (Xlink). FIG. 11 illustrates the example of conversion of information to which a plurality of files defining the both-way link are related. Which information is linked with which information 11-3 can be checked from the link information defined in a plurality of link files 11-1, 11-2 and the link is buried to respective information. The information e1/kiji-1.xml is linked to the information e1/kiji-2.xml and e2/kiji-n.xml. When the information is transmitted to a terminal 3 which cannot use the both-way link, if the information is transmitted to the terminal 3 without conversion thereof, the link information is neglected and is displayed as a document in which the link is not extended, for example, as illustrated in FIG. 12A. However, the conversion to incorporate a one-way link for e1/kiji-2.xml and e2/kiji-n.xml to the area where the both-way link included in e1/kiji-1.xml is defined, it is now possible to refer to the information correctly extending the link as illustrated in FIG. 12B even if the terminal 3 supports only the one-way link.

Figure 13:
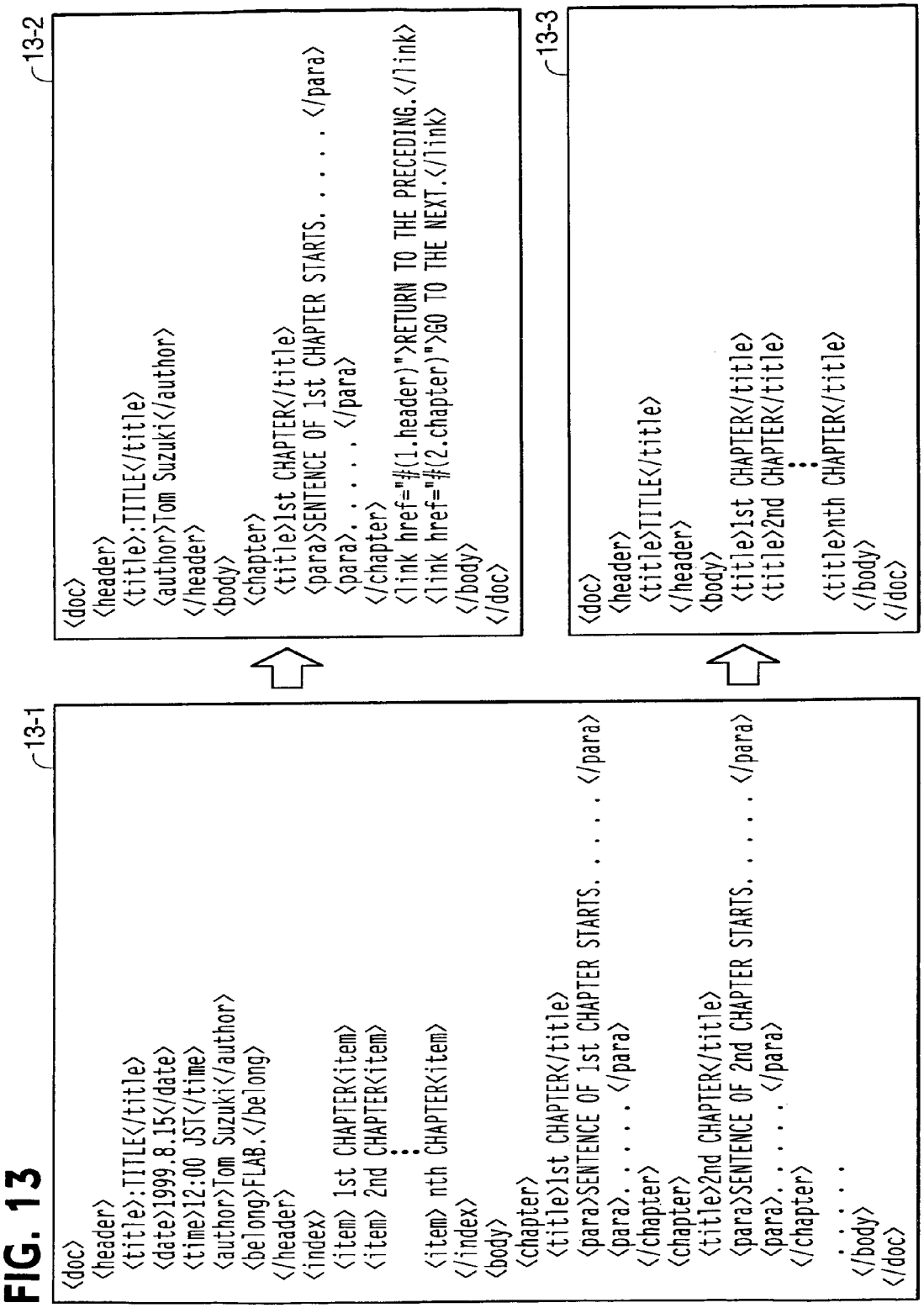
FIG. 13 is an explanatory diagram illustrating a fifth conversion example of the distributed information.

FIG. 13 illustrates an example of conversion in which the requested data is divided into a plurality of segments or chapters, each containing the amount of information which can be displayed by a terminal 3 that has a small display area. Even if the terminal 3 has a narrow display area, the information can be divided for effective reference by defining the storing address of divided data as the link information. In the conversion example 13-2 of FIG. 13, the information is divided for all contents of chapters and links to the chapter immediately before and after each chapter is added to the content of the divided chapters. In the conversion example 13-3 of FIG. 13, the information is divided for all contents of chapters and only the titles of chapters are independently generated in a contents display and the link is extended to the contents of each chapter from the contents page.

Figure 14:
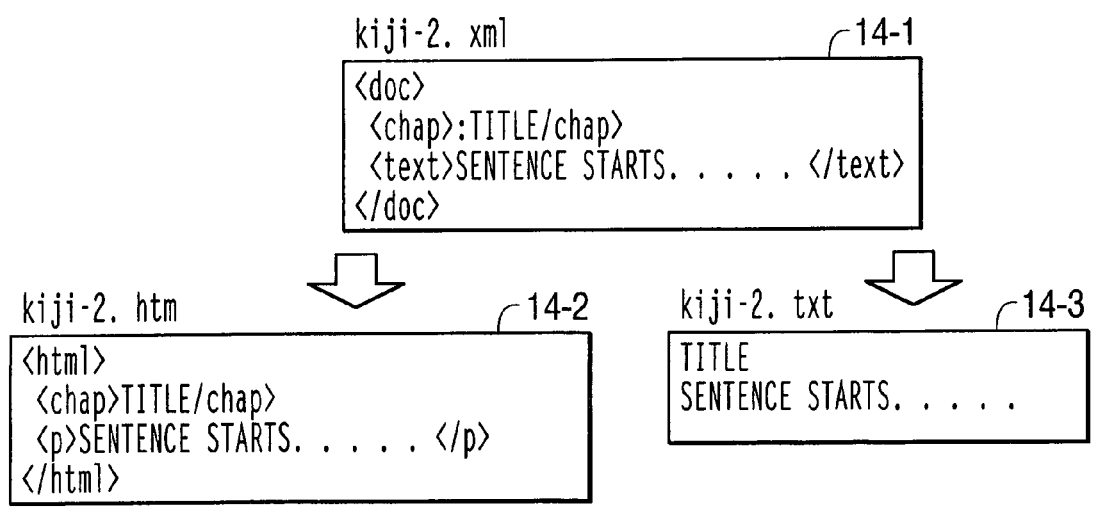
FIG. 14 is an explanatory diagram illustrating a sixth conversion example of the distributed information.

An example of conversion by the file format converting unit 53 is illustrated in FIG. 14. In the example of FIG. 14, the information itself is converted to a type assuring the reference depending on the function of the terminal 3, when information is registered in the format which cannot assure the display at the terminal 3 which has generated the information request. In the conversion example 14-2 of FIG. 14, the information described in the XML format is converted to the HTML format. In the conversion example 14-3 of FIG. 14, the control information indicating a structure of information called a tag included in the information described by XML is deleted and only the information to be displayed is extracted as text data. Thereby, the terminal 3 is capable of obtaining the information as the text data which assures reference in general with any kind of application.

As explained above, a user is capable of making reference to the information which is stored in various types existing on the network even if the user terminal is set to any condition without any loss of content of the registered information or with the displayed content approximated as much as possible to the requested content. Moreover, the information distributing side is also capable of avoiding the condition that the information is distributed in an unexpected condition and avoiding a condition disabling the distribution of information.

Moreover, in the field of structured language in which remarkable progress can be seen, the information registering side is capable of generating the information using novel functions without considering the condition in the information utilizing side. In addition, the maintenance work for information generated previously may be eased. Meanwhile, the user side is always making reference to the information requested without any maintenance for the environment of the terminal for each sale of novel software and distribution of newer versions of software, because the information requested is converted, before transmission, to a displayable format assuring reference to the distributing side even if the terminal being used does not support the new function.

What is claimed is:

1. A method of distributing information from at least one information distribution server to a plurality of terminals via a network, comprising:
    receiving an information request generated by user selection of a link in an online hypertext document at a requesting terminal; and
    determining whether conversion of requested information is necessary based on whether the requested information has a data format that can be utilized by the requesting terminal according to environment information identifying an application executing on the requesting terminal;
    converting at least a relevant part of the requested information into response information in a type and format that can be utilized by the requesting terminal based on the environment information for the requesting terminal, when it is determined that the conversion of the requested information is necessary;
    determining whether to perform said converting by using the identification of the application to access an application function management table cross referencing a plurality of registered applications and functions provided by the registered applications, and by transmitting an inquiry to the requesting terminal when the application function management table is unable to determine whether a required function included in the requested information can be performed at the requesting terminal;
    generating sample data for checking an application function on the requesting terminal based on the requested information;
    sending the sample data to the requesting terminal; and
    updating the application function management table depending on a response to the sample data from the requesting terminal.

2. A method as recited in claim 1, wherein the environment information is obtained from an information request from the requesting terminal for the requested information.

3. A method as recited in claim 1, wherein the identification of the application identifies a browser application, by name and version, that issued the information request.

4. A method as recited in claims 1,
    wherein said transmitting includes transmitting the inquiry with the required function incorporated therein, such that the inquiry can be responded to only if the required function executes properly on the requesting terminal, and
    wherein said determining is further based on whether a response to the inquiry is received from the requesting terminal.

5. A method as recited in claim 1, further comprising determining how to perform said converting by using the identification of the application to access a processing function management table cross referencing the plurality of registered applications with ways to convert information.

6. A method as recited in claim 5, wherein the environment information is supplemented using a user identifier, corresponding to a user of the requesting terminal, to access a user management table cross referencing a plurality of user identifiers with at least one of applications available at user terminals and types of user terminals.

7. A method as recited in claim 1, wherein said converting includes converting a pointer that cannot be resolved by the requesting terminal, by replacing the pointer with the content pointed to.

8. A method as recited in claim 1, wherein said converting includes converting a pointer that cannot be resolved by the requesting terminal into a file name to be displayed.

9. A method as recited in claim 1, wherein said converting includes converting a link of a type that the application does not support into at least one link of a type supported by the application.

10. A method as recited in claim 9, wherein said converting converts at least one of extended links and both-way links into one-way links.

11. A system for distributing information to a plurality of terminals via a network, comprising:
    a network interface unit, coupled to the network, to receive an information request generated by user selection of a link in an online hypertext document at a requesting terminal and to transmit response information to the requesting terminal;

an application function management unit determining whether conversion of requested information is necessary based on whether the requested information has a data format that can be utilized by the requesting terminal according to environment information including identification of an application executing on the requesting terminal;

a converting function unit, coupled to said network interface unit and said application function management unit, to convert at least a relevant part of the requested information into the response information in a type and format that can be utilized by the requesting terminal based on the environment information for the requesting terminal, when it is determined that the conversion of the requested information is necessary, said converting function unit including;

an application function management unit to determine whether to convert the requested information by using the identification of the application to access an application function management table cross referencing a plurality of registered applications and functions provided by the registered applications, and an inquiry function unit to generate an inquiry for the requesting terminal when the application function management table is unable to determine whether a required function included in the requested information can be performed at the requesting terminal, the inquiry incorporating the required function such that the inquiry can be responded to only if the required function executes properly on the requesting terminal, and said converting function unit determining what conversion is necessary based on whether a response to the inquiry is received from the requesting terminal; and an update unit, coupled to said network interface unit and said application function management unit, to generate sample data for checking an application function on the requesting terminal based on the requested information, to send the sample data to the requesting terminal, and to update the application function management table depending on a response to the sample data from the requesting terminal.

12. A system as recited in claim 11, wherein said converting function unit further includes a processing request management unit to determine how to convert the requested information by using the identification of the application to access a processing function management table cross referencing the plurality of registered applications with ways to convert information.

13. A system as recited in claim 11, wherein said converting function unit further includes a user management table cross referencing a plurality of user identifiers with at least one of applications available at user terminals and types of user terminals to identify the environment information.

14. A system as recited in claim 11, wherein said converting function unit includes a link content identification unit to convert a pointer that cannot be resolved by the requesting terminal into one of content pointed to by the pointer and a file name to be displayed; and a link information forming unit to convert at least one of a both-way link and an extended link for the application that cannot process such a link into at least one one-way link.

15. A computer readable storage controlling a computer to perform a method comprising:

receiving an information request generated by user selection of a link in an online hypertext document at a requesting terminal;

determining whether conversion of requested information is necessary based on whether the requested information has a data format that can be utilized by the requesting terminal according to environment information identifying an application executing on the requesting terminal;

converting, at least a relevant part of the requested information into response information in a type and format that can be utilized by the requesting terminal based on the environment information for the requesting terminal, when it is determined that the conversion of the requested information is necessary;

determining whether to perform said converting by using the identification of the application to access an application function management table cross referencing a plurality of registered applications and functions provided by the registered applications, and by transmitting an inquiry to the requesting terminal when the application function management table is unable to determine whether a required function included in the requested information can be performed at the requesting terminal;

generating sample data for checking an application function on the requesting terminal based on the requested information;

sending the sample data to the requesting terminal; and updating the application function management table depending on a response to the sample data from the requesting terminal.

16. A computer readable storage as recited in claim 15, wherein the environment information is obtained from an information request from the requesting terminal for the requested information.

17. A computer readable storage as recited in claim 15, wherein the identification of the application identifies a browser application, by name and version, that issued the information request.

18. A computer readable storage as recited in claims 15, wherein said transmitting includes transmitting the inquiry with the required function incorporated therein, such that the inquiry can be responded to only if the required function executes properly on the requesting terminal, and wherein said determining is further based on whether a response to the inquiry is received from the requesting terminal.

19. A computer readable storage as recited in claims 15, wherein said method further comprises determining how to perform said converting by using the identification of the application to access a processing function management table cross referencing the plurality of registered applications with ways to convert information.

20. A computer readable storage as recited in claim 19, wherein the environment information is supplemented using a user identifier, corresponding to a user of the requesting terminal, to access a user management table cross referencing a plurality of user identifiers with at least one of applications available at user terminals and types of user terminals.

21. A computer readable storage as recited in claim 15, wherein said converting includes converting a pointer that cannot be resolved by the requesting terminal, by replacing the pointer with the content pointed to.

22. A computer readable storage as recited in claim 15, wherein said converting includes converting a pointer that cannot be resolved by the requesting terminal into a file name to be displayed.

23. A computer readable storage as recited in claim 15, wherein said converting includes converting at least one of a both-way link and an extend link for the application that cannot process such a link into at least one one-way link.

24. An information distribution method used by an information distribution service to receive a request for information distribution generated by user selection of a link in an online hypertext document at a terminal connected via a network and to transmit requested information to the terminal, comprising:
    verifying functions of an application used by the terminal that sent the request for information distribution upon receipt thereof;
    determining whether the functions of the application can process requested information by reference to an application function management table cross referencing registered applications and functions provided by the registered applications, and by transmitting an inquiry to the terminal when the application function management table is unable to determine whether a required function included in the requested information can be performed at the terminal;
    converting, when it is determined that the process is impossible, at least a relevant part of the requested information into a type and format which may be processed by the application prior to transmission to the terminal; and
    updating the application function management table depending on a response to sample data generated and sent to the terminal to check an application function on the terminal based on the requested information.

25. An information distribution apparatus of an information distribution service to receive requests for information distribution generated by user selection of a link in an online hypertext document at terminals connected thereto via a network and to transmit requested information to the terminals, comprising:
    a conversion determination table provided for management of applications which may be operated on the terminal and corresponding functions to be processed by the applications;
    an application identification unit to identify the application used by a requesting terminal when an information request is accepted from the requesting terminal;
    a conversion determination unit, coupled to said conversion determination table and said application identification unit, to determine whether the application can process the requested information by referring to said conversion determination table;
    an inquiry function unit to inquire about functions of the application used by the requesting terminal when the application used by the requesting terminal is not registered in said conversion determination table;
    a converting unit, coupled to said conversion determination unit, to convert at least a relevant part of the requested information into converted information, different in at least one of type and format, that can be processed by the requesting terminal when it is determined that the application cannot process the requested information;
    a sample data generation unit to generate sample data for checking an application function on the requesting terminal based on the requested information;
    a transmission unit, coupled to said inquiry function unit, said converting unit and said sample data generation unit, to transmit the converted information to the requesting terminal and to transmit the sample data to the requesting terminal; and
    an update unit, coupled to said transmission unit, to update the conversion determination table depending on a response to the sample data from the requesting terminal.

26. An information distribution apparatus as recited in claim 25, wherein said converting unit converts, when the requested information includes content which cannot be processed by the requesting terminal, only that portion of the content which cannot be processed, depending on a converting system registered in said conversion determination table.

27. An information distribution apparatus as recited in claim 26, wherein a remaining portion of the content not processed by said converting unit is a link function or pointer function of XML.

28. A terminal apparatus used to receive an information distribution service that responds to an information distribution request from said terminal apparatus connected via a network by transmitting requested information to said terminal apparatus, comprising:
    a requesting unit, coupled to the network, to generate the information distribution request in response to user selection of a link in an online hypertext document, including environment information about at least one of an application used in said terminal apparatus and a function of the application, so that the information distribution service can determine whether conversion of requested information is necessary based on whether the requested information has a data format that can be utilized by the terminal apparatus based on the environment information and convert at least a relevant part of the requested information into response information in a type and format that can be utilized by said terminal apparatus based on the environment information, when it is determined that the conversion of the requested information is necessary;
    an inquiry response unit, coupled to the network, to respond to an inquiry from the information distribution service regarding whether a required function can be performed by said terminal apparatus when the information distribution service is unable to determine whether conversion of the requested information is necessary based on the environment information; and
    a sample data execution unit, coupled to the network, to execute sample data received from the information distribution service to test the function of the application and respond to the information distribution service with results of the test.

29. A terminal used to receive an information distribution service that responds to an information distribution request from said terminal connected via a network by transmitting requested information to said terminal, comprising:
    a computing unit, coupled to said network, which uses browser software on connection to the information distribution service to transmit, together with the information distribution request, environment information about at least one of application software which may be operated in cooperation with the browser software and application functions, so that the information distribution service can determine whether conversion of requested information is necessary based on whether the requested information has a data format that can be utilized by the terminal apparatus based on the environment information and convert at least a relevant part of the requested information into response information in a type and format that can be utilized by said terminal based on the environment information, when it is determined that the conversion of the requested information is necessary, said computing unit responding to an inquiry from the information distribution service regarding whether a required function can be performed by said terminal when the information distribution service is unable to determine whether conversion of the requested information is necessary based on the environment information, and executing sample data received from the information distribution service to test the application functions and respond to the information distribution service with results of the test.

30. A storage medium storing a program controlling a computer to provide an information distribution service to receive an information distribution request from a terminal connected via a network and to transmit requested information to the terminal, by performing a method comprising:

storing a conversion determination table provided for management of applications which may be operated on the terminal and corresponding functions to be processed with such applications;

identifying an application used by the terminal when the information distribution request, generated by user selection of a link in an online hypertext document at the terminal is received from the terminal;

determining whether a function of an identified application can process the requested information by referring to the conversion determination table;

inquiring about functions of the application used by the terminal when the application used by the terminal is not registered in the conversion determination table;

converting at least a relevant part of the requested information into converted information, different in at least one of type and format, that can be processed by the terminal when it is determined that processing of the requested information by the terminal is impossible;

generating sample data for checking an application function on the terminal based on the requested information;

transmitting the converted information to the terminal and the sample data to the terminal; and updating the conversion determination table depending on a response to the sample data from the terminal.

31. A storage medium as recited in claim 30, further comprising inquiring the terminal about functions of an application used by the terminal when the application used by the terminal does not exist in the conversion determination table.

32. A storage medium storing a program for controlling a computer to perform an information distribution service by receiving an information distribution request from a terminal connected via a network and transmitting requested information to the terminal, in a method comprising:

registering a conversion determination table provided for management of an application which can be processed on the terminal and corresponding functions which can be processed by the application;

identifying the application used in the terminal when the information distribution request, generated by user selection of a link in an online hypertext document at the terminal is received from the terminal;

inquiring about functions of the application used by the terminal when the application used by the terminal is not registered in the conversion determination table;

determining whether the requested information can be processed by the application by referring to the conversion determination table;

converting, when it is determined that the requested information cannot be processed by the application, at least a relevant part of the requested information into converted information, different in at least one of type and format, which can be processed by the terminal;

generating sample data for checking an application function on the terminal based on the requested information;

transmitting the converted information to the terminal and the sample data to the terminal; and updating the conversion determination table depending on a response to the sample data from the terminal.

33. A storage medium as recited in claim 32, further comprising inquiring the function of application used for the terminal when the application used in said terminal does not exist in said conversion determination table.

34. A method of distributing information from at least one information distribution server to terminals via a network, comprising:

receiving an information request including environment information for a requesting terminal identifying at least one of a plurality of data formats in which the at least one information distribution server can output information and identifying an application executing on the requesting terminal;

determining whether conversion of information requested by the information request is necessary based on whether the requested information has a data format that can be utilized by the requesting terminal according to the environment information for the requesting terminal;

inquiring about functions of the application used by the terminal when the application used by the requesting terminal is not registered in the conversion determination table;

converting at least part of the information requested by the information request from a first type and format in which the information is stored on the at least one information distribution server into a second type and format that can be utilized by the requesting terminal based on the environment information for the requesting terminal, when it is determined that the conversion of the requested information is necessary;

generating sample data for checking an application function on the requesting terminal based on the requested information;

transmitting the converted information to the requesting terminal and the sample data to the requesting terminal; and updating the conversion determination table depending on a response to the sample data from the requesting terminal.

* * * * *

UNITED STATES PATENT AND TRADEMARK OFFICE
CERTIFICATE OF CORRECTION

| | |
|---|---|
| PATENT NO. | : 7,165,222 B1 |
| APPLICATION NO. | : 09/657460 |
| DATED | : January 16, 2007 |
| INVENTOR(S) | : Toshimitsu Suzuki et al. |

It is certified that error appears in the above-identified patent and that said Letters Patent is hereby corrected as shown below:

Column 12, Line 27, change "claims" to --claim--.

Column 14, Line 10, change "converting," to --converting--.

Column 14, Line 42, change "claims" to --claim--.

Column 14, Line 51, change "claims" to --claim--.

Signed and Sealed this

First Day of April, 2008

JON W. DUDAS
*Director of the United States Patent and Trademark Office*